(No Model.) 3 Sheets—Sheet 2.
B. F. JACKSON.
HEATING APPARATUS.
No. 599,985. Patented Mar. 1, 1898.
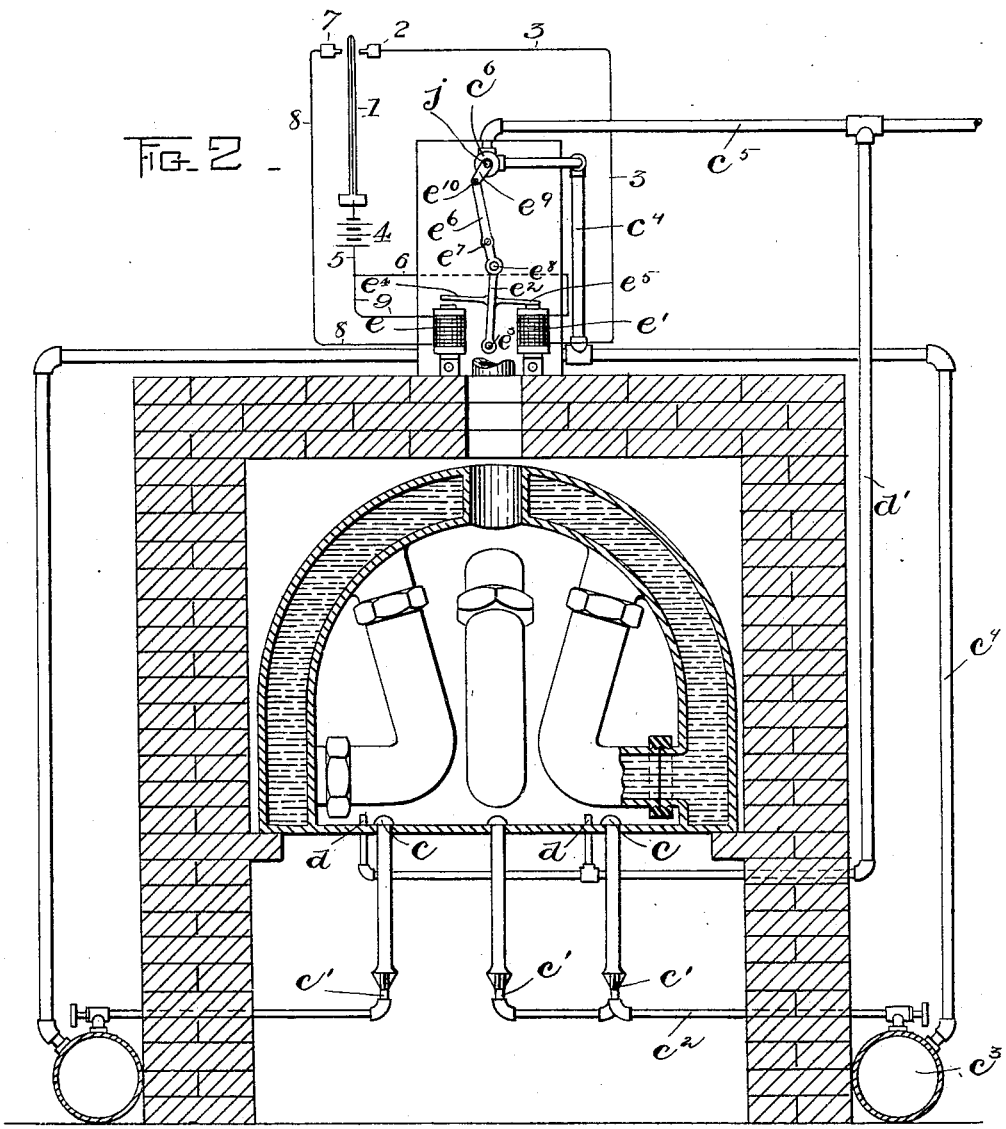

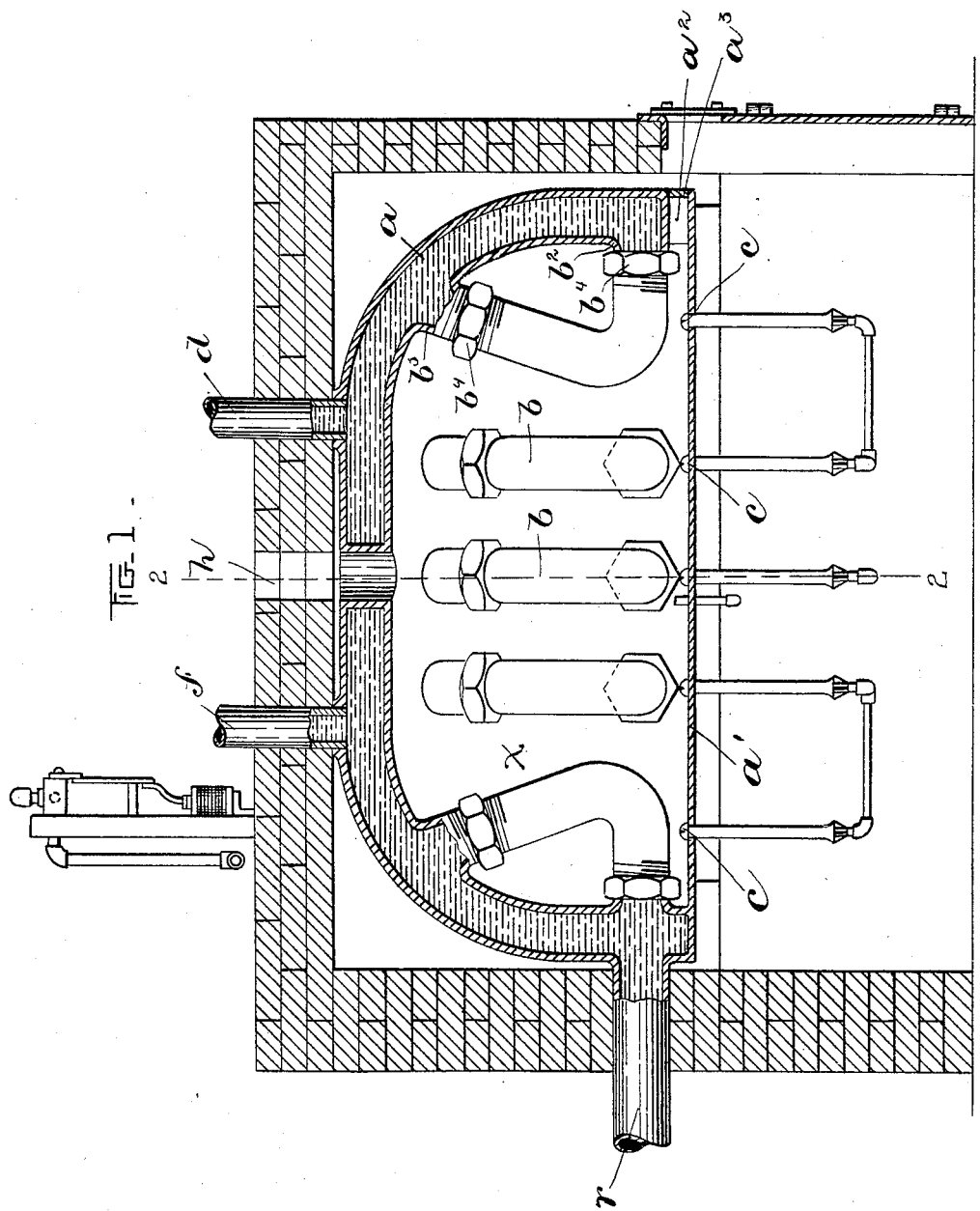

(No Model.)
B. F. JACKSON.
HEATING APPARATUS.
No. 599,985.
3 Sheets—Sheet 3.
Patented Mar. 1, 1898.
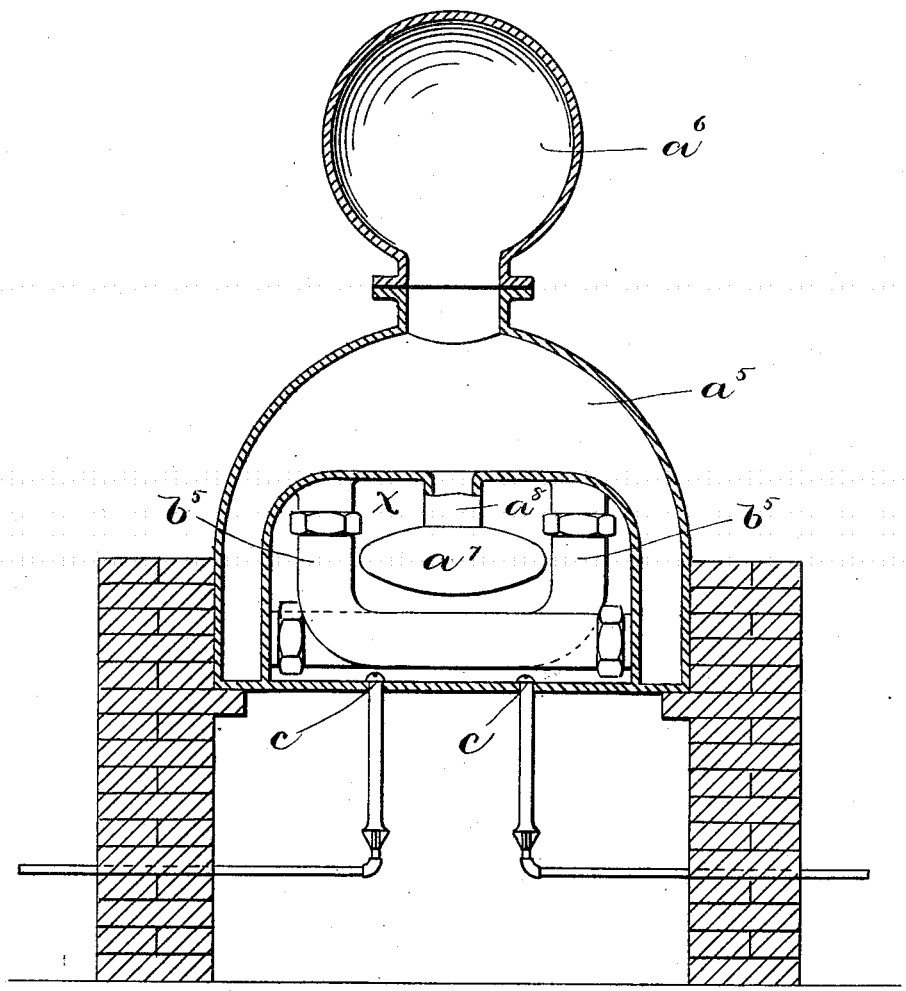

UNITED STATES PATENT OFFICE.

BENJAMIN F. JACKSON, OF CAMBRIDGE, MASSACHUSETTS.

HEATING APPARATUS.

SPECIFICATION forming part of Letters Patent No. 599,985, dated March 1, 1898.

Application filed February 16, 1897. Serial No. 623,702. (No model.)

*To all whom it may concern:*

Be it known that I, BENJAMIN F. JACKSON, of Cambridge, in the county of Middlesex and State of Massachusetts, have invented certain new and useful Improvements in Heating Apparatus, of which the following is a specification.

This invention relates to apparatus for heating water, primarily to cause its circulation through a system of heating-radiators, although my invention may be applied to a boiler for generating steam.

The invention has for its object to provide a water-heating apparatus adapted to utilize gaseous fuel and to be operated with a high degree of effectiveness and economy.

The invention consists in the improvements which I will now proceed to describe and claim.

Of the accompanying drawings, forming a part of this specification, Figure 1 represents a longitudinal section of a heating apparatus embodying my invention. Fig. 2 represents a section on line 2 2 of Fig. 1. Fig. 3 represents a sectional view of a steam-generating heater embodying my invention.

The same letters and numerals of reference indicate the same parts in all the figures.

In the drawings, $a$ represents a water-reservoir or boiler, which is composed of two dome-shaped shells or walls separated by an intervening water-space, the inner wall inclosing or covering a heating-chamber $x$. The central and upper portion of the dome is provided with a flue or outlet $h$ for the escape of products of combustion from the heating-chamber. Within the chamber $x$ are a series of elbow-shaped conduits $b$, each of which comprises a substantially horizontal arm connected with the lower portion of the dome and a substantially vertical arm connected with the upper portion of the dome, the dome being provided with nipples $b^2$ $b^3$, to which the ends of the conduits $b$ are detachably secured by any suitable means. I prefer to screw-thread the nipples $b^2$ $b^3$ and the end portions of the conduits $b$ and connect said parts by means of unions $b^4$, although any other suitable means of connection may be employed. The conduits $b$ are preferably made of copper, their walls being relatively thin, so that the water within them will be readily heated.

$c$ $c$ $c$ represent a series of burner-tubes located under the horizontal arms of the conduits $b$ and arranged to direct the flames of gas ignited in said tubes against said horizontal arms. The burner-tubes $c$ pass through a horizontal plate or wall $a'$, which joins the base of the dome $a$ and forms the bottom of the heating-chamber $x$, said bottom being preferably joined air-tight to the dome to prevent the entrance of cold air into the heating-chamber, excepting at the front end, where a clean-out opening $a^2$ is or may be formed in the base of the dome above the bottom $a'$, said opening $a^2$ having a suitable cover $a^3$. The burner-tubes $c$ pass through orifices in the bottom $a'$ and closely fit said orifices, so that there is no admission of air to the heating-chamber around the burner-tubes.

The burner-tubes are provided with air-inlets located outside the heating-chamber, and with gas-inlet pipes $c'$, arranged to admit gas to the interior of the burner-tubes, where it is mingled with air, on the principle of the Bunsen burner. The gas-supply pipes $c'$ are connected by pipes $c^2$ with a suitable source of gas-supply, which may include a reservoir $c^3$, connected by a system of pipes $c^4$ with a main gas-supply pipe $c^5$, there being a cock $c^6$ in the connection between the pipes $c^5$ and $c^4$, whereby gas may be shut off from the burners. Said cock is preferably arranged to be closed automatically by a thermostatic device hereinafter described.

$d$ $d$ represent igniting-burners, which are located in close proximity to the burner-tubes $c$ and are supplied by an independent pipe $d'$, connected with the main supply-pipe $c^5$. The igniting-burners $d$ are constructed to deliver small flames in such proximity to the burner-tubes $c$ as to ignite the mixed gases issuing from the latter. The gas is not shut off from the igniting-burners by the action of the cock $c^6$, so that said igniting-burners are always ready to ignite the gas in the burners $c$ whenever it is turned on by the automatic action of the cock $c^6$.

The construction thus far described is adapted particularly for heating water to be circulated through flow-pipes $f$ to a system of radiators and returned thence through return-pipes $r$ to the lower portion of the dome.

In Fig. 3 I show a steam-generator embodying my invention, in which $a^5$ represents the dome, which is preferably made deeper at its central portion than at its side portions $b^5$, the elbow-shaped conduits connecting the lower with the upper portions of the dome, and $c\ c$ the burners arranged to direct flames against the horizontal arms of the conduits $b^5$. To the upper portion of the dome is connected a steam-drum $a^6$. $a^7$ represents a supplemental water-reservoir located within the heating-chamber and connected by a neck $a^8$ with the upper portion of the drum, the object of this supplemental reservoir being to more fully utilize the heat in the heating-chamber $x$.

It will be seen that by providing a dome-shaped water-reservoir or boiler inclosing or covering a heating-chamber, and providing elbow-shaped conduits in said chamber adapted to readily conduct heat to water contained in them, and gas-burners entering said chamber and arranged to direct flames against the horizontal portions of the said conduits, I have produced a simple, effective, and economical heating apparatus.

The outlet at the top of the dome for the products of combustion permits the free circulation of the heated products of combustion through the chamber and along all portions of the external surface of the conduits and the inner wall of the dome. Owing to the fact that the burners are arranged under the conduits and not under the spaces between said conduits, the greater intensity of heat is applied directly to the conduits and is not wasted in the spaces between them. The closed bottom, having a practically air-tight connection with the base of the dome and with the burner-tubes, prevents the admission of cold air to the heating-chamber and contributes to the effectiveness of the apparatus. This advantage in effectiveness is due to the fact that no inflowing currents of air can disturb the flames and impair their efficiency by blowing them away from the conduits.

I have here shown as the means for actuating the cock $c^6$ two electromagnets $e\ e'$, which are connected in two independent circuits, each having a thermostatic circuit breaking and closing device located in an apartment heated by the above-described apparatus, a lever $e^2$, pivoted at $e^3$ to a fixed support, and having affixed to it armature-arms $e^4\ e^5$, arranged to coöperate, respectively, with the magnets $e\ e'$, a lever $e^6$, pivoted at $e^7$ to a fixed support and connected at $e^8$ with the lever $e^2$, and a crank-arm $e^9$, affixed to the cock $c^6$ and connected at $e^{10}$ with the upper end of the lever $e^6$. The circuit which includes the magnet $e$ is arranged to be closed when the temperature rises to a predetermined degree, the circuit through the magnet $e'$ being then broken. When the temperature falls to a predetermined degree, the circuit through the magnet $e'$ is closed and that through the magnet $e$ is broken. Hence but one of the magnets can be energized at a time. When either magnet is energized, it attracts the corresponding armature-arm and moves the cock $c^6$ through the intervening connections, thus shutting off the gas from the burners when the temperature rises to a given degree and turning on the gas when the temperature falls to another given degree. To illustrate one way in which this portion of my invention may be carried into effect, I have indicated in Fig. 2 a common form of compound bar thermostat, as at 1, and two contact-pieces to coöperate therewith, as at 2 and 7. The contact 2 is connected with the magnet $e'$ by the wire 3, and the base of the thermostat is connected with a battery or other source of electrical energy, as at 4, the latter being connected with the magnet $e'$ by the wires 5 and 6. The magnet $e$ is connected with the contact 7 by the wire 8 and with the wire 5 by means of the wire 9. It will be readily seen that when the thermostat is in contact with the piece 2 the magnet $e'$ is energized through the connections 3, 5, and 6, and that when the thermostat is in contact with the piece 7 the magnet $e$ is energized through the connections 8, 9, and 5.

I claim—

1. A heating apparatus of the character specified, comprising a dome-shaped water-receptacle or boiler covering a heating-chamber and having an outlet in its upper portion for the escape of products of combustion from said chamber; a series of elbow-shaped conduits within the heating-chamber, each comprising a substantially horizontal arm connected with the lower portion of the dome, and a substantially vertical arm connected with the upper portion of the dome; and burners located below said horizontal arms and arranged to direct the flames against said horizontal arms, the chamber being closed to the admission of air.

2. A heating apparatus of the character specified, comprising a dome-shaped water-receptacle or boiler covering a heating-chamber and having an outlet in its upper portion for the products of combustion; a plate or wall joining the base of the dome and forming the bottom of said chamber, and provided with orifices; burners projecting through and closely fitting said orifices; and elbow-shaped conduits in the heating-chamber, each comprising a substantially horizontal arm connected with the lower portion of the dome and located over one of said burners, and a substantially vertical arm connected with the upper portion of the dome, the chamber being closed to the admission of air, and the burners being adapted to direct the flames against the horizontal arms of the conduits.

3. A heating apparatus of the character specified, comprising a dome-shaped water-receptacle or boiler covering a heating-chamber and having an outlet in its upper portion for the products of combustion; elbow-shaped conduits in said chamber connecting the lower with the upper portions of the dome, a plate or wall joining the base of the dome and forming the bottom of said chamber; burner-tubes extending through orifices in said bottom and closely fitting said orifices, to prevent the admission of air to the chamber around the tubes, said burner-tubes having air-inlets below the bottom of the chamber; and gas-supply pipes arranged to deliver gas within said tubes to mingle with the air admitted thereto, the chamber being closed to the admission of air, and the burners being adapted to direct the flames against the conduits.

4. A heating apparatus of the character specified, comprising a dome-shaped water-receptacle or boiler covering a heating-chamber; elbow-shaped conduits in said chamber connecting the lower with the upper portions of the dome; burner-tubes located under said conduits; gas-supply pipes connected with said burners and having provisions for shutting off gas therefrom; igniting-burners adjacent to said burner-tubes; and independent gas-supply pipes connected with the said igniting-burners, the chamber being closed to the admission of air, and the burners being adapted to direct the flames against the conduits.

In testimony whereof I have signed my name to this specification, in the presence of two subscribing witnesses, this 29th day of December, A. D. 1896.

BENJAMIN F. JACKSON.

Witnesses:
C. F. BROWN,
A. D. HARRISON.